United States Patent [19]

Bergk et al.

[11] 4,092,202
[45] May 30, 1978

[54] METHOD FOR JOINING FOILS

[75] Inventors: Berndt Bergk; Klemens Lilienbeck; Gerhard Friedrich Ottmann; Heinrich Stolzenbach; Herbert Wramba; Walter Wulff, all of Wuppertal, Germany

[73] Assignee: Dr. Kurt Herberts & Co. Gesellschaft mit beschrankter Haftung Vorm. Otto Louis Herberts, Wuppertal, Germany

[21] Appl. No.: 628,384

[22] Filed: Nov. 3, 1975

[30] Foreign Application Priority Data

Nov. 4, 1974 Austria .................................. 8807/74

[51] Int. Cl.$^2$ ................................................ C09J 5/00
[52] U.S. Cl. ........................................ 156/331; 156/324; 260/77.5 AM; 428/424
[58] Field of Search ............... 156/331, 332, 324, 315, 156/319; 428/423, 425, 424; 260/77.5 AM, 77.5 AT, 77.5 A, 75 NK, 75 NW, 75 NE, 75 NA; 427/407 R

[56] References Cited

U.S. PATENT DOCUMENTS

| | | | |
|---|---|---|---|
| 2,430,479 | 11/1947 | Pratt et al. | 428/424 |
| 2,929,800 | 3/1960 | Hill | 260/77.5 AM |
| 3,061,557 | 10/1962 | Hostettler et al. | 260/77.5 AB |
| 3,198,692 | 8/1965 | Bridgeford | 156/331 |
| 3,261,813 | 7/1966 | Ramos | 260/77.5 AM |
| 3,471,445 | 10/1969 | Carr | 260/77.5 AM |
| 3,577,295 | 5/1971 | Kraft et al. | 156/324 |
| 3,658,939 | 4/1972 | Carpenter et al. | 260/77.5 AM |
| 3,840,419 | 10/1974 | De Keyser et al. | 156/324 |

Primary Examiner—William A. Powell
Assistant Examiner—J. J. Gallagher
Attorney, Agent, or Firm—Donald D. Jeffery

[57] ABSTRACT

A method for joining foils which includes the steps of mechanically coating at a high speed at least one of the foil sides to be joined with a reaction product of a hydroxy-functional polyethers or polyesters with polyisocyanates or polyisothiocyanates, said reaction product containing free —NCO or —NCS groups and being reactable with H-acid compounds, and subsequently laminating foils. The reaction product has an average molecular weight of from about 500–10,000 and a —NCO or —NCS group content of from about 1–10% by weight, is substantially solvent-free when applied and has a viscosity of at most 60 Pas under application conditions. The temperature of the reaction product application conditions is adjusted to at most 140° C but not less than a temperature which is so far below the temperature of the ambient air that air humidity will be condensed in the reaction product to be applied in such an amount that its pot-life would drop the value required for the implementation of the method.

11 Claims, 3 Drawing Figures

METHOD FOR JOINING FOILS

BACKGROUND OF THE INVENTION

This invention relates to a method for joining foils by means of mechanical coating at a speed of preferably more than 50 m/min using an adhesive coating mass and subsequent lamination of the foils.

It is known that foils, consisting of the most varied materials, such as cellulose derivatives, polyolefins, polyesters, polyamides, metals such as tin or aluminum, which may also be subject to surface treatment by flaming or dark discharge or which, to improve the physical properties, can be coated with synthetic substances, for example, polyvinylidenechloride, can be joined together by means of glue systems in order to combine the properties of the various foils into one complex. It can be the objective of such an effort to achieve special decorative effects or to bring about technical effects, such as protection for an imprint, production of highly heat resistant complexes, stopping, vapor diffusion, heat-sealability, reliable avoidance of porosity, and resistance against aggressive substances.

Particularly appreciated among the adhesive systems employed for such coatings are cross-linked bonding agent systems involving a reaction of isocyanate groups with hydroxy-functional compounds.

According to the state of the art, this adhesive system as a rule consists of the following:

(a) Solutions of hydroxyl-group-containing polyesters, polyether or simultaneously ester-and ether-group-containing hydroxy-functional condensation products which, shortly before being used for coating, are mixed with a solution of polyfunctional isocyanates and which then form cross-linkages while forming urethane-or polyurea compounds.

(b) Solutions of free-isocyanate-group-carrying preadduct from hydroxy-functional polyesters, polyethers, or mixed polyether-esters, which, following the addition of polyols or simply due to the action of water from the environment (air humidity or adsorbed moisture from boundary surfaces) cross-link while forming higher-molecular polymers via urethane-and/or polyurea compounds.

It is characteristic of such coating adhesive systems, which are used on a large scale today, that they are applied upon the foils to be joined from a relatively low-visosity, low-solid solution, containing large quantities of solvent. The application is mostly via roller application mechanisms and in very small layer thickness at ambient temperature. It is also a characteristic that, prior to joining the coated foils in the laminating plant into layered systems having good initial and aging adhesion values, the solvents, which account for 60–90% by weight of the wet application and which are mostly quite valuable, volatile, combustible and partly physiologically objectionable, are completely removed to the greatest possible extent in effective drying stages and are disposed of without harming the environment.

Here are some particular disadvantages deriving from the laminating adhesive systems (a) and (b) used in the production of high-grade foil coatings based on the state of the art:

1. To generate sufficient initial adhesion, higher-molecular bonding agent systems are required which can be applied only from solutions of relatively low concentration at room temperature and in a sufficiently thin, well-wetting and uniform manner.

2. The solvents (ketones, esters, aromatic substances) are mostly very expensive and are often physiologically objectionable; considering the presently customary very high coating speeds, it is very difficult to remove them, that is to say, this can be done only with a tremendous energy expenditure, with plants having long evaporation assembly lines, large suctioning systems and room ventilation systems, exhaust air combustion (catalytic or thermal), large quantities of fresh air, and therefore high energy costs.

3. The solvent-containing adhesive systems are undesirable in terms of storage and transportation because of the level of hazard involved.

4. The transportation and packaging volumes are disproportionately high compared to the thin layers of adhesive in the laminates to be produced.

5. The residual solvents in the film, which are difficult to remove, for example, in the case of packaging complexes, endanger the materials to be packaged because they exert influence in the form of taste and odor.

6. In the case of NCO-group-containing adhesive systems, the solvents are particularly expensive because they must be completely free of water prior to use.

7. Two-component systems are particularly hard to handle in the plant and increase the danger of mistakes during the combination of components in the plant.

8. The low-visosity isocyanate component solution entails dangers in handling, especially for inexperienced personnel, such as this would be unavoidable during transportation.

The effort to avoid these disadvantages—by trying to develop cross-linking two-component lamination adhesive which would contain as little solvent as possible, and which involve reaction of isocyanate groups with alcoholic hydroxyl groups and possibly water—has so far failed because it was considered necessary, in order to achieve good adhesion (especially good initial adhesion), that the laminating adhesive bonding agents, contained in the solution, possess a high "average molar weight" and high viscosity (i.e., firm consistency). These properties however rule out any application in a form devoid of solvents.

It is furthermore known that one can apply thermoplastic synthetics in solvent-free form, so-called hotmelts, that is to say, waxes or copolymers from the melt, upon the foils and that one can use them to laminate foils. Such composite structures in particular entail the disadvantage that the coatings must be applied in a comparatively great thickness, that the coatings are not transparent, and that the composite systems have no heat resistance because of the thermoplastic nature of the coating. Moreover, these hotmelts are sensitive to aggressive filler materials.

It is known that one can avoid the disadvantages of thermoplastic hotmelts by means of solvent-free adhesive systems consisting of several components (U.S. Pat. No. 3,840,419). The desired small application quantities of 0.5–5mu are achieved through pre-dosing, by dosing elements known per se and by further stretching the medium to be applied by at least 1:10 by means of differing roller speeds in the application elements or through different speeds of the application roller and the substrate to be coated. A further compelling prerequisite in this method is that the obviously very fast setting adhesive must always be transferred completely from one roller to the next one, respectively, from the application roller to the film to be coated, in order to avoid premature hardening on the rollers. For this purpose, the adhesive is charged into the dosing device by means of a special feeder device and only in that quantity in which it is finally transferred to the film to be coated.

SUMMARY OF THE INVENTION

It is an object of the present invention to provide a method for joining foils by means of coating with a laminating adhesive mixture and subsequent coating, where the use of solvents is at least extensively avoided, but where nevertheless a uniform application in extremely thin layers is possible at high-speed mechanical coating and where, immediately after coating, the foils are so firmly joined together, that is to say, the shear strength is so great, that the laminated foil strips will not shift with respect to each other or become separated from each other or form bubbles or folds during processing. Moreover, the foils must not "telescope" during rapid windup.

It is also an object of the invention to provide an adhesive system which is easy to handle and which does not require the mixing of several components. This system should be used to join foil complexes of the kind described, and creates heat-stable composite structures (for example, boil-proof, sterilizable, heat-sealable compound structures), through chemical cross-linking without the above-described disadvantages of the usual coating adhesives. Furthermore, the adhesive should be capable of being processed according to the invention on customary coating or laminating machines without necessitating any expensive mixing-, feeder-, or dosing-subassemblies which are vulnerable in use. Apart from the possibility of varying the circumferential speeds of the individual rollers to a minor extent, no additional expensive regulator or drive mechanisms should be needed.

DESCRIPTION OF THE PREFERRED EMBODIMENTS

In accomplishing the foregoing objects there has been provided according to the invention a method for joining foils by the steps of: mechanical coating at a speed of preferably more than 50 m/min of one or both of the foil sides to be joined together with reaction products which are derived from hydroxyl-functional polyethers and/or polyesters and which contain free —NCO and/or —NCS groups, and possibly of polyamines, aminoalcohols, or polyols with polyiso(thio)-cyanates, which reaction products can react with H-acid compounds, optionally in admixture with auxiliary substances and/or additives used for technical purposes in glueing; and subsequent laminating of the foils. The process is characterized by the fact that the mixing products possess an average molecular weight of between about 500–10,000 and a content of —NCO and/or —NCS groups of from about 1–10% by weight, the fact that no solvents are added to the mass to be applied, the fact that the mass to be applied has a viscosity of at most 60 Pas under application conditions and that the temperature of the application mass is at most 140° C and also that its temperature on the surface layer, which is cooled very considerably because of the poor heat conductivity of the mass, is not so far below the temperature of the ambient air that sufficient quantities of air humidity will be condensed in the application mass located in the tank of the application machine so that the pot-life of the application mass in the tank will drop below the value required for implementation of the method.

The coating speed employed in the course of the method according to the invention should be as fast as possible so that the method may be as economical as possible. Coating and laminating customary machines are used which have a heatable application mechanism. The coating speed is preferably more than 50 and particularly preferably in the range of about 100–300 m/min. Basically however one can also use faster speeds if the machines are designed accordingly. An extraordinarily thin coating application of, for example, about 0.1–10 $g/m^2$, preferably about 0.5–5 $g/m^2$, is sufficient.

The essential component of the application mass is a reaction product, containing free —NCO and/or —NCS groups, said reaction product being derived from hydroxyl-functional polyethers and/or polyesters and optionally from polyols with polyisocyanates or polyisothiocyanates. Polyethers, which are used to make these reaction products, are preferably aliphatic, straight- or branched-chain products which preferably possess a molecular weight of from about 300–4,000, particularly preferably from about 400–2,000. Such products are sold by various firms under trade names (for example, the Desmophene-U-types of Bayer AG, Leverkusen, Pluracol-types of the Wyandotte Company, Niax-types of Union Carbide, U.S.A., polyglycols of Farbwerke Hoechst, Germany).

Suitable linear or branched polyesters are, for example, made of aliphatic and/or aromatic polycarboxylic acids and polyols, whereby the molecular weight preferably is within the same ranges as those that were mentioned for the polyethers. These products likewise are offered by many companies in the trade (for example, Desmophen-types of Bayer AG, Leverkusen). One can also use those products which have both polyester and polyether bonds in the same molecule. Frequently the above-mentioned products are not uniform compounds but rather mixtures of substances. This is well understood by those skilled in the art.

In addition to the polyethers and/or polyesters there can be used for the production of reaction products other such compounds which contain at least two groups which can react with —NCO— and/or —NCS— groups. The amounts of such compound related to the total weight of the reaction products, as a rule should not be more than about 30% by weight, preferably no more than about 20% by weight. Such suitable compounds include, among others, amines, aminoalcohols, and especially polyols, for example, aliphatic compounds having 1 to 8 carbon atoms which preferably contain 2 to 4 hydroxl groups in the molecule, such as glycol, neopentylglycol, and glycerin.

The polyisocyanates which are used to make the above mentioned reaction products are aliphatic and/or aromatic and/or cycloaliphatic compounds with preferably 2 or 3 —NCO— and/or —NCS— groups in the molecule. These products are commercially available, for example, under the trade name of Desmodur by Bayer AG, Leverkusen. The molecular weight of the polyisocyanates and polyisothiocyanates which are used for making the reaction products is preferably in the range of from about 100–1,500 and especially preferably between about 150–500.

As said above, the reaction products have an average molecular weight of from about 500–10,000 and a content of —NCO— and/or —NCS— groups of from about 1–10% by weight. The molecular weight is preferably in the range of about 1,000–6,000, particularly preferably in the range of about 1,000–4,500. The content of —NCO— and/or —NCS— groups is preferably in the range of about 2–8% by weight, particularly preferably in the range of about 3–6% by weight. By percent by weight, in the sense of this definition, is meant the share of the weight of the —NCO— and/or —NCS— groups out of the total amount of reaction products.

The application mass should have a maximum viscosity of 60 Pas under application conditions. The viscosity is preferably under about 20 Pas, particularly preferably under about 10 Pas. By viscosity under application conditions is meant that viscosity which the application mass exhibits in the tank of the application machine.

The processing temperature is selected so that the viscosity of the mass, when the application mechanism is correspondingly adjusted, permits the desired application volume, while avoiding that the foil, which is to be coated, is damaged by the temperature applied or is unfavorably influenced in terms of its quality and gauge. The temperature of the coating mass therefore should not be above 140° C, preferably not above 120° C, particularly preferably not above 100° C. By temperature, in this sense, is meant once again the temperature of the application mass in the tank of the application machine.

Another essential requirement in the method according to the invention is that the temperature of the coating mass must not be so far below the temperature of the ambient air that enough air humidity will be condensed into the coating mass located in the tank of the application machine so that the pot-life of the coating mass in the tank will drop below the value required for implementation of the method. When the temperature of the coating mass is too low, the moisture from the ambient air can be condensed on the surface of the coating mass because of the temperature drop and, since the coating mass as a rule is agitated in the tank of the application machine, more and more moisture is introduced into the coating mass. The moisture beings about an incipient cross-linking of the reaction products contained in the coating mass, as a result of which the pot-life of the coating mass is considerably shortened. The consequence is that the cross-linking becomes so strong as time passes that the coating method can no longer be carried out. If, on the other hand, according to the method in this invention, the temperature of the coating mass is kept high enough, then condensation of air humidity is avoided and it is extraordinarily surprising that, when this requirement is met, the pot-life of the coating mass is not influenced and remains constantly high. By means of simple experiments, the artisan can determine the suitable average temperature by considering the particular existing air humidity and the temperature of the surrounding air, that is to say, the environmental temperature. As a rule, it is enough when the temperature of the coating mass does not fall below the temperature of the ambient air or, at best, if it is a few degrees Centigrade below in order to prevent the pot-life from being disadvantageously influenced in the sense described above.

As explained above, no added solvents should be contained in the application mass according to the invention. The above-described disadvantages of using solvents are thus completely avoided because, when the above-defined parameters are maintained, quite surprisingly a perfect application and a high initial shear strength are achieved.

By way of auxiliary substances and/or additives which are helpful in terms of glueing technique, the application mixture according to the invention may contain, for example, reaction accelerators such as tertiary amines, metal-organic compounds, such as dibutyl-tin-dilaurate, lubricants, dyes, pigments, or filler materials, thermoplastic resins or plasticizers.

The reaction products used according to the invention should have a reactivity of about 5 hours maximum. The reactivity preferably is 1 hour, maximum, and particularly preferably about 30 minutes. Fundamentally, the reactivity can and should be even higher than indicated above so that the reaction will take place as fast as possible after application upon the foil and this is why reactivity values about 15 minutes or even 10 minutes maximum are particularly practical. The reactivity is determined as follows:

500 g of the glue used are placed in a tin with a diameter of 100 mm which is sealed against the entry of air and moisture and they are stirred at about 60° C at a speed of about 300 rpm. The stirrer has four blades with an outside arc of 45 mm diameter. The end of the stirrer is 1 cm away from the bottom of the tin. Then we add, to the glue in the tin, 1 Mol water per equivalent of the free —NCO— and/or —NCS— groups contained therein, and we measure the time until the start of gelatinization, which can be recognized by the fact that the mass rises along the stirring shaft. The reactivity of the resin increases in proportion to the decrease in time until the start of this effect. (The entry of moisture is prevented by covering with aluminum foil through which the stirring shaft runs.) But if, in the same manner, this procedure is carried out without the addition of water, there will, after 13 hours of stirring, be only a viscosity increase of, for example, from about 0.77 to 1.38 Pas. It has so far not been considered possible to take glues with such a high reactivity toward water— that is to say, toward air humidity—in a solvent-free state over a period of even only 1 hour, not to mention longer periods of time of about 5 hours or more, and expose them to air humidity in a standard application machine and thus process them, without getting gelatinization. On the other hand, after application upon the foil to be coated, the hardening process begins so fast that the method according to the invention can be carried out in a trouble-free and simple manner.

By pot-life, within the meaning of the invention here, there is meant the time for which the application mass remains viscosity-stable in the tank of the application machine, under conditions prevailing there, to such an extent that perfect processing will be assured. For trouble-free processing on hitherto customary machines, which have an open, tempered storage container for the application mass, a pot-life of at least 5 hours is required which facilitates trouble-free processing during one 8-hour shift.

When the above-defined measures are complied with, safe implementation of coating during an 8-hour day or during continual shift operation is facilitated, and the foils are so firmly joined immediately after coating that, even at high machine speeds, there will be no bubble or crease formation as a result of the foils being shifted with respect to each other, or there will be no shifting of the foil during windup, which is called "telescoping".

One unanticipated advantage of the method according to the invention is that, in spite of solvent-free application, a perfect, uniform coating, even in quantities of about 0.5 g/m$^2$ is possible. It is likewise surprising that even at such small application volumes, completely bubble-free laminates are obtained which are highly transparent in the case of clear films, and this is true both in the case of laminating with hot (50°–100° C) and cold (20° C) laminating rollers. Thus the transparency disturbances, which appear, for example, at high processing speeds also in the case of the known adhesive systems, vanish completely within a short time. In comparison to known methods, it is therefore possible to achieve identical transparency with smaller application quantities, and better transparency with the same application quantity. The possibility of attaining, through solvent-free application of the adhesive, such small application quantities and such high transparency in transparent foil complexes is particularly surprising if we realize that the quantity applied must bridge all uneven spots in the foils to be joined (peak-to-valley height, undulations, etc.) so that one can create a composite structure without interstices.

A complete as possible filling of all uneven spots was achieved, according to the state of the art, by applying a diluted solution in a relatively large quantity in order, after the evaporation of all solvents, to leave the desired thin film behind. The smaller the desired adhesive application, the more diluted was the solution used in order to attain a still sufficiently high and uniform wet application.

The method according to the invention can be carried out on the most varied types of machinery, for example, pressure, laminating, and hotmelt machines, whereby the only prerequisite is a heatable application mechanism which is suitable for thin application at the required machine operating speed. The adhesive application can be accomplished with smooth or patterned rollers, either coaxially or counter-currently, or also with suitable wipers. Differing circumferential speeds of the application rollers, and/or relative speeds of the rollers of the application mechanism with respect to each other, and/or between the application roller and the foil web to be coated, may be advantageous for the purpose of achieving optimum applications but are not absolutely required. This is known to the artisan as part of the state of the art. To get the best and most uniform application possible, the lamination may be accomplished immediately after the application mechanism. It is not necessary to connect evaporation zones, IR or hot-air drying or heating ducts or additional devices between the steps, even at high machine operating speeds (for example, in excess of 100 m/sec).

One particular feature of the method according to the invention is that, in spite of the viscosity which is low at the application temperature, a sufficient bonding of the foils is achieved immediately after they leave the laminating mechanism. This is the only way in which shifting of the foils toward each other can be prevented and this is the only way in which fold formation, bubble formation, telescoping, etc., can be avoided, and in this way the composite foil can be wound up perfectly into a roll.

For this property it is important that the adhesive give the foil complex, in the desired application quantity, a high shear strength (for example, more than 200 g/cm$^2$). Shear strength is measured as follows:

A glued sample piece is traction-stressed whereby the force attacks, on one side, along the upper individual foil and, on the other side, along the lower individual foil, so that we get horizontal shearing. The force measured is divided by the surface and gives us the system-specific "shear strength" in g/cm$^2$, at identical application quantities.

The essence of the invention furthermore includes that the laminates, made according to the invention, become bound as fast as those which have been made according to the hitherto known methods. That is to say, they achieve the desired strength in the composite structures and resistance against mechanical, chemical (from aggressive filler materials) and thermal (boiling, sterilization, heat-sealing) stress through chemical cross-linking. In practice this means that the desired high adhesion values must be achieved after a few hours up to a few days and that the ability to be boiled and sterilized must be achieved after 6–12 days.

Although the above requirement is met, it was unexpectedly discovered that, when the parameters of the method according to the invention are complied with, the coating mass remains stable, that is to say, an adequate pot-life was preserved. Thus it was found, for example, that, with a temperature treatment at 90° C lasting several days, the coating mass did reveal a rise in viscosity which however was so small that the processability of the aged material was not disadvantageously influenced. Even samples which had been exposed to the effect of air humidity in the open tank of a coating machine for more than 8 hours at 90° C with constant thorough mixing by the application rollers, could once again be processed in the machine after an intermediate storage of 8 days in a closed container without loss of any of their properties.

This fact is all the more surprising since we know from the handling of solvent-containing isocyanate products that the pot-life, according to past experience, grows longer as the solution is more diluted and that one would have to expect a particularly poor stability for solvent-free products. Accordingly it is required in U.S. Pat. No. 3,840,419 that the adhesive, during the transition from one dosing roller to another one, and/or, from the dosing roller to the film to be coated, in each case must be transferred practically completely so that there cannot be any hardening on a roller. According to British Pat. No. 1,158,740, premature gelatinization, or hardening of the material must be prevented by mixing the remnants of the adhesive by the defined shearing forces, immediately with fresh material. In the case of solvent-containing adhesives according to the state of the art, it is frequently recommended, for example, that adhesive mixtures, which are not used up at the end of a working day, be diluted very heavily in order to thus prevent overnight gelation.

This surprising and favorable effect of the method according to the invention can perhaps be explained by saying that, during the application of solvent-containing adhesives, there is always an evaporation of the solvents, especially on the rollers. The cooling of the surface, brought about by evaporative cooling promotes the absorption of moisture from the air especially when the dew point has been reached. In a solvent-containing adhesive, which has remained for 3 hours in the machine while the application mechanism was kept running, it is already possible to establish a water content of 1–1.5% depending upon the prevailing air humidity, while a solvent-free product did not absorb any noticeable quantities of water. The performance of the solvent-free adhesive, which is more favorable because there is no evaporative cooling, is further supported by heating because the temperature difference to the dew point of the air is then even greater.

With this good stability of the application mass in the coating machine it furthermore could not be expected that the reactivity and hardening speed of the adhesive, after application on the foil surface, would be so great that the above-described requirements existing in practice would be met. Instead, it would be especially the very long pot-life during heating under the influence of air humidity which would have led to the expectation that there would be no useful hardening at all or that the time intervals would be too long so that they could not be useable in practice. Moreover, it was to be expected that the viscosity, which was kept relatively low for solvent-free application, would considerably increase the time until the complete hardening of the foil complexes due to the requirement for a larger number of cross-linking steps, compared to the highly viscous materials, in order to achieve the desired duroplastic state.

The reaction products, contained in the adhesive mixture, also contain free —NCO— and/or —NCS— groups which can react with H-acid compounds. The artisan is familiar with this reaction capability. As H-acid compounds we can use all compounds which are present on the surface of the foils to be joined, partly due to adsorption, or which are contained in the surface. Water is particularly important as H-acid compound in the implementation of the method according to the invention; water is present in the form of air humidity and, practically also on all surfaces, as a thin adsorbed layer in quantities sufficient for the cross-linking of the adhesives used according to the invention. For cross-linking and to achieve good adherence, functional groups in the foil surface, such as hydroxyl-, hydroperoxide-, and carboxyl groups can also be involved.

The terms "solvent-free" and "solvent-free application" mean that no solvents or other low-molecular substances need be added to the application mass to lower the viscosity. These substances are volatile at processing temperature and thus have a "transport function." Due to the molecular weight distribution of polymer substances and due to the absorption of gases, moistuure, and other substances from its environment, every substance used in practice contains a cured mass which is just a little bit below the theoretically anticipated 100%.

According to the method in this invention, one can join together any of the foils which were mentioned in the introduction to the specification and any which are also bonded together according to the state of the art with the use of laminating adhesives which are cross-linked via isocyanate groups.

The invention is further explained on the basis of the attached drawings. Identical parts have been provided with the same reference numbers in the figures.

DETAILED DESCRIPTION OF THE PREFERRED EMBODIMENT

Figure 1:
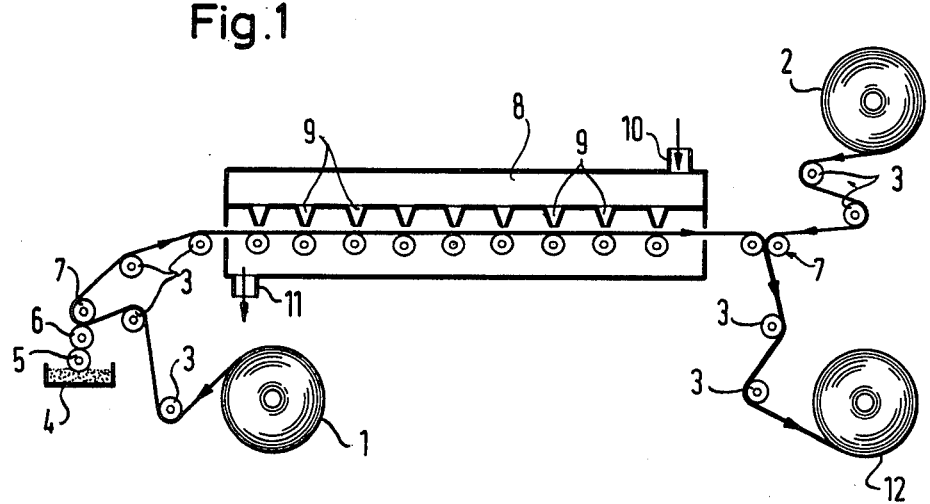
FIG. 1 is a diagrammatic view of a laminating machine modified in accordance with the present invention.

FIG. 1 is a diagram showing a customary laminating machine for solvent-containing adhesives which however can be used according to the method in this invention whereby the drying duct is not used. The roller, which unreels one of the foils to be joined, is numbered 1. In tank 4 is the laminating adhesive, that is to say, the application mass according to the invention. This mass is applied via the dipping roller 5 and the application roller 6, onto one side of the foil strip running off roller 1. Pressing roller 7 forces the foil against application roller 6. The air nozzles 9 which are present in the machine in drying duct 8 are not used according to the method in this invention; instead, they are used only for the subsequently described comparative example, using the method according to the state of the art. For this purpose, air is piped through the drying duct via air inlet 10 and air outlet 11. The second foil, which is to be joined together with the first foil, is unwound from roller 2 and is guided via deflection rollers 3 to the pressing mechanism 7 where the two foils are pressed against each other by means of rollers. The composite foil structure, the foils laminated together, is wound up on roller 12.

Figure 2:
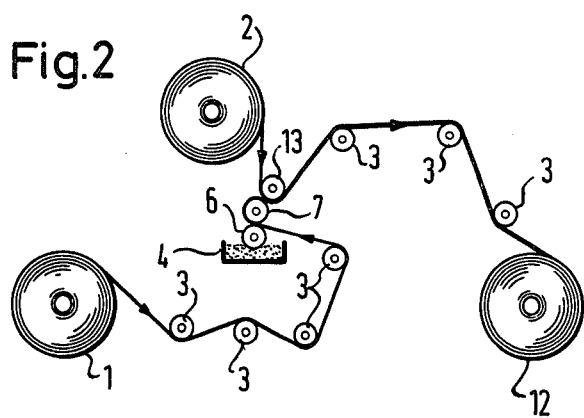
FIG. 2 is a simplified form of machine for implementing the method according to the present invention.

FIG. 2 is a diagram showing a simply designed machine for implementing the method according to the invention, not containing the drying duct because the latter is not required for the method according to the invention. Such machines are used in the so-called hot-melt method. The foils to be joined together are once again unreeled from rollers 1 and 2. One of the foils is once again coated, after it has been guided via deflection rollers 3 between application roller 6 and press-on roller 7. Application roller 6 brings the application mass from the tank on one side of the foil strip. Between the press-on rollers 7 and 13, the two foils are joined together and are wound up on roller 12.

Figure 3:
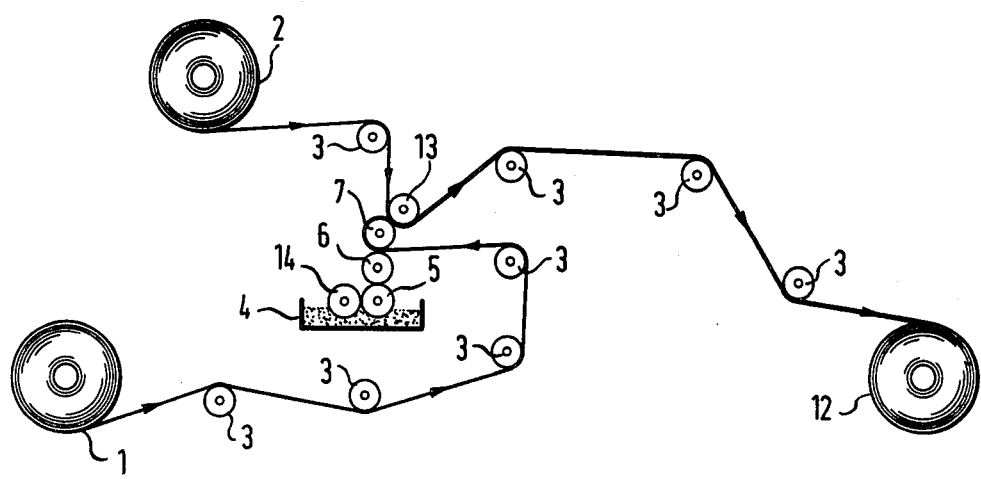
FIG. 3 is a coating and laminating unit preferably used for working with "hot-melt" coating and laminating masses.

FIG. 3 shows a coating and laminating unit, as is used preferably for working with "hot-melt" coating and laminating masses.

The application medium is in tank 10. The non-rotating steel roller 14, which can be heated, presses against the rubber roller 5, whereby the level of the pressure determines the quantity of adhesive which gets through the gap when roller 5 rotates. This adhesive which is on the surface of roller 5, is taken off by roller 6 (steel roller, likewise heatable) which runs at higher speed in contact with roller 5 and it is applied upon the foil strip which is pressed on by rubber roller 7. It is a good idea here to keep the circumferential speed of rollers 6 and 7 identical.

From the unreeling roll 2, the incoming strip is fed via the deflection roller 3 to the coating mechanism in such a manner that the film, coated with adhesive, can be joined with the incoming strip between rollers 7 and 8 without any bubble formation. Then comes the windup in winding station 9. The glue becomes thoroughly hard in the rolls within a few days.

Production of Bonding Agents Suitable for Method According to The Invention

Bonding Agent A:

To 250 parts by weight of polypropylene-ether-glycol, with an average molecular weight of about 2,000, is added, in a reaction vessel, 62.5 parts by weight diphenylmethanediisocyanate (MDI), while stirring, and the mixture is heated to 90° C until a viscosity of 1.5 Pas is attained, measured at 80° C in a platecone viscosity meter. The —NCO content of the reaction product is 3.5% by weight. This value is achieved after a reaction time of about 6 hours. The solid, measured as cured residue after 1 hour at 150° C, is 99% by weight. The reaction speed, calculated as above, is about 8 minutes.

Bonding Agent B:

From 1,500 g polyglycol with a molecular weight of 1500, 348 g toluenediisocyanate (TDI), a bonding agent is made, in the manner described above, the NCO-content of which is 4.28% by weight. The viscosity measured at 100° C is 0.41 Pas. The reaction speed is about 6 minutes.

Bonding Agent C:

350 g of a polyester from adipic acid and ethyleneglycol with a hydroxyl content of about 1.8% by weight, 84.6 g MDI and 4.7 g TDI are mixed as described above up to a viscosity of 4.5 Pas, measured at 100° C. NCO-content: 2.39% by weight. Reaction speed: about 6 minutes.

Bonding Agent D:

2,000 g polypropyleneglycol with a molecular weight of about 2000, 425 g MDI and 76.3 of a reaction product of a 3 Mol hexamethylenediisocyanate and 1 Mol water are mixed as described above up to a viscosity of 1.7 Pas, measured at 100° C. NCO-content: 4.95% by weight. Reaction speed: about 10.2 minutes.

Example 1

The bonding agent described above is filled into the heated storage tank 4 of the laminating machine of conventional design, illustrated in FIG. 1, and it is heated to 120° C. At the same time the application roller 6 is preheated to 100° C. After the given temperatures are obtained, a 12.5-mu thick polyester foil is coated with the application mixture whereby the application roller is driven in the same direction. The foil thus coated is then guided through the drying duct 8 although the latter is not heated and is not charged with fresh air because this is not required in the method according to the invention. After the drying duct—between a stationary-attached roller and press roller 7—a polyethylene foil with a thickness of 50 mu, which on the side to be glued had earlier been subjected to a Corona treatment, is applied. The temperature of the press-on roller is 40° C. After rolling-up, further hardening takes place during storage. The value given subsequently for the composite adhesion and the solvent residue are measured after 5 days.

Table 1

| | |
|---|---|
| application weight | 1.2 g/m$^2$ |
| movement speed | 100 m/min |
| composite adherence | 400 g/20 mm |
| solvent residue | 0 mg/m$^2$ |

The composite adherence is measured as follows: a 20-millimeter wide strip of the foil composite made is clamped into a tearing machine at the peeling angle of 2 × 90°; then the joined foil strips are separated at a feeding speed of 50 mm/min and the force required for separation is measured; this force is measured in g/20 mm.

The solvent residue is determined as follows: from the middle position of the wound-up coated composite foil a sample piece is taken and heated in a gas-proof tank for 1 hour up to a maximum of 120° C so that no cracking products of the laminated foil will develop. We take a sample from the gas chamber of the container and we examine it gaschromatographically.

Comparative Example 1

On the same coating machine, used according to Example 1, a composite foil structure is made of the same foils as those in Example 1; this is done with a customary solvent-containing coating adhesive which is made of an esterification product from phthalic acid, adipic acid, and ethyleneglycol, and, a second component, triisocyanate (made from 1 mole trimethylolpropane and 3 moles toluylenediisocyanate), which has solvent ethylacetate and a solids content of 35% by weight. The operating conditions are the same with the exception of the heating of the application roller and the tank and the insertion of the drying duct. Hot air with a temperature of 80° C is blown on the coated foil in the drying duct.

| | |
|---|---|
| application weight (wet) | 4.6 g/m$^2$ |
| application weight (dry) | 1.6 g/m$^2$ |
| operating speed | 100 m/min |
| composite adhesion | 400 g/20 mm |
| solvent residue | 40 mg/m$^2$ |
| exhaust air volume | 3,600 m$^3$/hr |
| energy consumption for heating the air, approximately | 65,000 Kcal/hr |

The residual quantity of glue clouded after 1 day and gelatinized after 2 days.

Example 2

On a machine without drying duct (see FIG. 2)—which essentially consists of a directly powered application mechanism with three superposed rollers, two unreeling devices and one windup device—a laminate from a 12.5-mu thick polyester foil and a 9 mu thick aluminum foil is made, in that the polyester foil is coated with the solvent-free adhesive which had been heated to 90° C and is joined together with the aluminum foil between rollers 7 and 13. After 5 days of storage, the composite adherence and the solvent residue are measured.

Table 3

| | |
|---|---|
| application weight | 1.5 g/m$^2$ |
| operating speed | 100 m/min |
| composite adherence | 420 g/20mm |
| solvent residue | 0 mg/m$^2$ |

The application mass according to the invention has a flash point of more than 150° C while the application mass, used according to the comparative example 1, has a flash point below −4° C. When the application mass according to the state of the art is used, explosion-protected systems must be employed, something which is not required in the method according to the invention.

Example 3

On a machine without drying duct (FIG. 3)—essentially consisting of a directly powered combined application and coating mechanism with five rollers, two unreeling devices and one windup device—a laminate is made from a 30-mu thick polyamide foil and a 50-mu thick pretreated polyethylene foil, in that the polyamide foil is coated with solvent-free adhesive B which is heated to 95° C and is joined with the polyethylene foil between rollers 7 and 13. The composite adherence and the solvent residues are measured after 7 days of storage.

Table 4

| | |
|---|---|
| application weight | 1.3 g/m² |
| operating speed | 80 m/min |
| composite adherence | >900 g/20 mm (film torn) |
| solvent residue | 0 mg/m² |

Example 4

On a machine according to FIG. 3, aluminum foil with a thickness of 10-mu is coated with solvent-free adhesive A and is applied to a paper of 80 g/m². The temperature of the material in the tank and on rollers 4 and 6 is about 100° C.

Table 5

| | |
|---|---|
| application speed | 1.2 g/m² |
| operating speed | 300 m/min |
| composite adherence | not separable, paper split |
| solvent residue | 0 mg/m² |

Example 5

On a machine according to FIG. 3, 12-mu aluminum foil is coated with solvent-free adhesive B and is applied to a 50-mu thick Corona-pretreated polyethylene. Temperature in tank and on rollers: about 75° C.

Table 6

| | |
|---|---|
| application weight | 2.0 g/m² |
| operating speed | 100m/min. |
| composite adherence | >430 g/2 cm, |
| solvent residue | 0 mg/m² |

Example 6

On a laminating machine with an application mechanism according to FIG. 2, an oriented, Corona-pretreated polypropylene foil is coated with solvent-free adhesive C and is laminated between roller pair 7 and 13 with a 30-mu thick Corona-pretreated polyethylene foil. Temperature in tank and of roller 6: about 120° C.

Table 7

| | |
|---|---|
| application weight | 1.4 g/m² |
| operating speed | 14 m/min |
| composite adherence | >350 g/2cm, film torn |
| solvent residue | 0 mg/m² |

Example 7

Experimental setup as in Example 6, but adhesive B is used this time and, in place of the oriented polypropylene foil, a nonoriented polypropylene film is used. Temperature in the tank and of roller 6: about 95° C.

Table 8

| | |
|---|---|
| application weight | 1.4 g/m² |
| operating speed | 14 m/min |
| composite adherence | 700 g/3cm, film torn |
| solvent residue | 0 mg/m² |

Example 8

Experimental setup as of Example 6, but instead of the oriented polypropylene film, a biaxially-stretched polypropylene film is used with a thickness of 30 mu which is coated on both sides with PVDC, whereby adhesive D is applied. Temperature in tank and of roller 6: about 80° C.

Table 9

| | |
|---|---|
| application weight | 1/4 g/m² |
| operating speed | 14 m/min |
| composite adherence | 400 g/2cm, film torn |
| solvent residue | 0 mg/m² |

Example 9

Experimental setup as Example 6, but instead of the oriented polypropylene film, a cellulose glass web (34 g/m² surface weight) is used which is lacquered with nitrocellulose on one side and which is coated on the non-lacquered cellulose glass side with solvent-free adhesive C and this combination is then applied to a 50-mu thick polyethylene layer. Temperature in tank and on roller 6: about 120° C.

Table 10

| | |
|---|---|
| application weight | 1.5 g/m² |
| operating speed | 14 m/min |
| composite adherence | 500–700 g/2cm |
| solvent residue | about 1 mg/m² (from cellulose glass lacquering) |

We claim:

1. In a method for joining foils including the steps of mechanically coating at a high speed at least one of the foil sides to be joined with a reaction product of a hydroxy-functional polyethers or polyesters with polyisocyanates or polyisothiocyanates, said reaction product containing free —NCO or —NCS groups and being reactable with H-acid compounds, and subsequently laminating the foils, the improvement which comprises said reaction product having an average molecular weight of from about 500–10,000 and a —NCO or —NCS group content of from about 1–10% by weight, said reaction product being substantially solvent-free when applied and having a viscosity of at most 60 Pas under application conditions, and adjusting the temperature of the reaction product application conditions to at most 140° C but not less than a temperature which is so far below the temperature of the ambient air that such an amount of air humidity will be condensed in the reaction product to be applied that its pot-life would drop the value required for the implementation of the method.

2. The method according to claim 1, wherein said foil is coated with from about 0.1–10 g/m² of said reaction product.

3. The method according to claim 1 wherein the polyester or polyether, used to make the reaction product, has a molecular weight of from about 300–4,000.

4. The method according to claim 1, wherein reaction products contain a co-polymerized polyol in a quantity of less than about 30% by weight.

5. The method according to claim 1, wherein the polyisocyanates or polyisothiocyanates has a molecular weight in the range of about 100–1,500.

6. The method of claim 1, wherein said coating speed is greater than about 50 m/min.

7. The method of claim 2, wherein said amount is between about 0.5 and 5 g/m².

8. The method of claim 3, wherein said molecular weight is between 400 and 2,000.

9. The method of claim 4, wherein said polyol is present in an amount of less than about 20% by weight.

10. The method of claim 5, wherein said polyisocyanates or polyisothiocyanates has a molecular weight of between about 150 and 500.

11. The method of claim 1 wherein said reaction product contains co-polymerized therein at least on component selected from a polyamine, and amino alcohol and a polyol.

* * * * *